(12) United States Patent
Mlynarczyk et al.

(10) Patent No.: US 8,297,717 B2
(45) Date of Patent: *Oct. 30, 2012

(54) VEHICLE LINE-LOCKING BRAKING SYSTEM AND METHOD

(76) Inventors: Scott Mlynarczyk, South Lyon, MI (US); Daniel Joseph Dunn, Canton, MI (US); Michael V. Leese, Troy, MI (US)

( * ) Notice: Subject to any disclaimer, the term of this patent is extended or adjusted under 35 U.S.C. 154(b) by 392 days.

This patent is subject to a terminal disclaimer.

(21) Appl. No.: 12/762,294

(22) Filed: Apr. 16, 2010

(65) Prior Publication Data

US 2011/0175439 A1    Jul. 21, 2011

Related U.S. Application Data

(63) Continuation-in-part of application No. 12/691,585, filed on Jan. 21, 2010.

(51) Int. Cl.
  *B60L 3/00* (2006.01)
  *H02G 3/00* (2006.01)
(52) U.S. Cl. ......................... 303/20; 307/10.1
(58) Field of Classification Search ............... 303/9.64, 303/15, 20, 122.08; 701/71, 72, 82; 307/10.1
  See application file for complete search history.

(56) References Cited

U.S. PATENT DOCUMENTS

| | | | |
|---|---|---|---|
| 1,561,612 A | 11/1925 | Marcacci | |
| 5,600,185 A | 2/1997 | Hamma | |
| 5,707,117 A * | 1/1998 | Hu et al. | 303/122.08 |
| 5,781,869 A | 7/1998 | Parlett, Jr. | |
| 6,166,629 A | 12/2000 | Hamma | |
| 6,406,103 B1 * | 6/2002 | Elliott et al. | 303/20 |
| 6,428,118 B1 * | 8/2002 | Blosch | 303/9.64 |
| 6,954,690 B2 * | 10/2005 | Watanabe et al. | 701/71 |
| 7,136,729 B2 * | 11/2006 | Salman et al. | 701/32.9 |
| 8,175,785 B2 * | 5/2012 | Turski et al. | 701/82 |
| 2007/0096557 A1 | 5/2007 | Tamai | |
| 2008/0004766 A1 * | 1/2008 | Gallo et al. | 701/29 |
| 2008/0015761 A1 | 1/2008 | Bellego | |
| 2011/0175438 A1 * | 7/2011 | Mlynarczyk et al. | 303/20 |

* cited by examiner

*Primary Examiner* — Christopher Schwartz
(74) *Attorney, Agent, or Firm* — Raymond L. Coppiellie; Just Intellectuals, PLLC (57) ABSTRACT

The present disclosure relates to various computer-implemented methods of line-locking a hydraulic vehicle braking system. A method includes performing a preliminary system check and controlling the distribution of fluid between a hydraulic module and an individual wheel-end brake component when the preliminary check is satisfied. The system continues to monitor predetermined vehicle inputs during activation.

22 Claims, 5 Drawing Sheets

VEHICLE LINE-LOCKING BRAKING SYSTEM AND METHOD

CROSS-REFERENCE TO RELATED APPLICATIONS

This application claims priority to and is a continuation-in-part of U.S. patent application Ser. No. 12/691,585 titled "A Vehicle Line-Locking Braking System and Method" filed Jan. 21, 2010, which is hereby incorporated by reference in its entirety.

TECHNICAL FIELD

The present disclosure relates to methods of line-locking hydraulic braking systems and braking systems for accomplishing the same.

BACKGROUND

Conventional vehicle braking systems include hydraulic and electric systems. Each system provides different performance characteristics. Generally speaking, hydraulic systems are more widely implemented and are less complex, less expensive braking systems. There are contemporary hydraulic systems that are supplemented with electronic components to provide anti-lock braking and traction control.

Some vehicles, e.g., "muscle cars," manipulate a vehicle's braking system to improve tire traction at vehicle launch. To ensure maximum tire grip at take-off, a driver can conduct a "burn-out" in a water box to heat up the rear tires just prior to launch. With many conventional vehicles, in order to conduct a controlled burnout, a driver needs to manipulate the service brake system to allow the rear wheels to spin freely while the front brakes are applied. In some cases, the burn-out is achieved by the driver manipulating the throttle, brake and clutch. This is not a user-friendly delivery system as it requires the driver to synchronize inputting various commands into the vehicle simultaneously. Moreover, if the vehicle is not in the best condition for burn-out, e.g., the wheels are slightly turned, it can be difficult for the driver to detect this.

Alternatively, a vehicle owner can install an aftermarket system that will allow the driver to keep the front brakes applied while the rear brakes are released; after the driver releases the brake pedal a much more controlled burn-out can be accomplished. Such aftermarket systems are inferior to a system incorporated with the original vehicle equipment for various reasons. For example, aftermarket systems can have reliability issues, are usually purely mechanical systems having no electric or automated controls which can also be less user-friendly, they are not repeatable and they do not perform real-time vehicle monitoring of pre-determined critical inputs that can increase the performance of the braking system before, during and/or after burn-out.

There are completely electric braking systems that can be incorporated into the vehicle which control the distribution of power between the front and rear braking systems. For example, U.S. Patent Application No. 2008/0015761 titled "Electric Braking Device for Vehicles" discloses a purely electric braking system that includes an on-board computer and control module which controls the power supply to the braking modules. Since this system utilizes electric brakes the system is more complex and more expensive than systems having hydraulic brakes. Moreover, the control logic disclosed in the '761 Application is not tailored to a line-locking function but is tailored toward mitigating detected degradations in the operating modes of the brakes to reduce the overall power consumption of a vehicle. The disclosed braking device would not accommodate a vehicle line-locking braking system.

Therefore, it is desirable to have a method of line-locking a hydraulic vehicle braking system and a braking system for accomplishing the same that is more user-friendly. It is further desirable to have a system that performs preliminary system checks and real-time monitoring of critical vehicle inputs to improve vehicle performance before, during and/or after burn-out. A feature is needed that will utilize the original vehicle equipment to provide a burn-out feature that is controlled and repeatable for the driver without the need of adding any additional content.

SUMMARY

The present invention may address one or more of the above-mentioned issues. Other features and/or advantages may become apparent from the description which follows.

Certain embodiments of the present invention include a computer-implemented method of line-locking a hydraulic vehicle braking system, the method including: receiving an electric signal related to a driver request; performing a preliminary system check of a system condition; monitoring the system condition, driver request or a vehicle condition; and controlling the distribution of fluid between a hydraulic module and a wheel braking component according to the system condition, driver request or vehicle condition. The performing a preliminary system check or monitoring includes assessing whether a predetermined time limit has been exceeded.

Another exemplary embodiment of the present invention includes a vehicle line-locking braking system, having: a brake actuator; a hydraulic brake module configured to provide brake pressure to wheel braking components; and an electric control module configured to control the brake module according to a system condition, driver request or vehicle condition. The electric control module comprises system logic configured to assess whether a predetermined time limit has been exceeded. The control module is configured to disable a valve in the brake module if the predetermined time limit has been exceeded.

Another exemplary embodiment of the present invention relates to a vehicle configured to line-lock, the vehicle including: a user interface; an electric control module configured to receive a signal from the user interface for activation of a line-locking system; and a hydraulic brake module including a plurality of valves configured to control brake pressure to wheel brake components. The electric control module comprises system logic configured to assess a line-locking system condition, driver request or vehicle condition. The system logic is configured to assess whether a predetermined time limit has been exceeded. The control module is configured to disable a valve in the brake module if the predetermined time limit has been exceeded.

The present teachings provide a method that will allow the driver to apply the vehicle brake system in such a manner to allow a controlled burn-out utilizing the vehicle's electronically controlled hydraulic brake system.

One advantage of the disclosed burn-out or line-locking feature is that it utilizes standard hardware equipment already found on vehicles. There is no need for an owner to purchase an aftermarket, add-on system.

The disclosed line-locking feature utilizes failsafe criteria so that the system can only be activated in a controlled manner. Moreover, the disclosed features constantly monitor key vehicle parameters and conditions once activated to ensure the driver maintains control and mechanical or electronic system malfunctions are accounted for.

Yet another advantage of the disclosed braking systems is that they can be incorporated into the vehicle providing a user or driver interface. The interface is integrated into the vehicle versus having to make modifications to the vehicle for aftermarket systems.

An additional advantage to the disclosed line locking system is that it is based on electronic controls which provide repeatable and controlled burn-outs versus an add-on system that can have significant variability.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same references numbers are used in the figures for identical or essentially identical elements. The above features and advantages and other features and advantages of the present invention are readily apparent from the following detailed description of the best modes for carrying out the invention when taken in connection with the accompanying drawings. In the figures:

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, FIGS. 1-6c, wherein like characters represent the same or corresponding parts throughout the several views there are shown exemplary vehicle line-locking braking systems and methods pertaining to the use of the same. The disclosed braking systems can be used in various types of vehicles including for example small/large cars, coupes, sedans, convertibles, trucks, vans, minivans and SUVs. The braking system can be adapted to include all drive configurations. In some embodiments, the braking systems include hydraulic brake modules that are governed by an electric control module. The electronic control module is configured to valve off each individual wheel's braking components according to predetermined conditions.

The present teachings also relate to a method that will allow a driver to apply the vehicle's brake system in a manner to provide a controlled burn-out, utilizing the vehicles electronically controlled hydraulic brake system. In the illustrated exemplary embodiments, a vehicle brake system includes an electronic module which is attached to a hydraulic brake module (or valve block). Each individual wheel braking circuit is controlled via the electronic module and the electronic module's manipulation of the hydraulic brake module. The electronic module, in conjunction with the hydraulic brake module has the capability to provide brake pressure, reduce brake pressure and isolate brake pressure with respect to each individual wheel.

Figure 1:
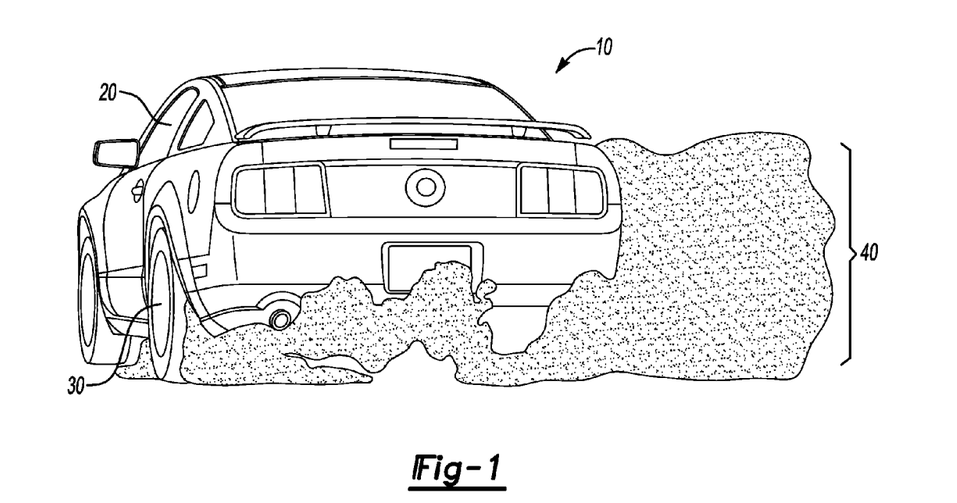
FIG. 1 is a rear view of a vehicle with a braking system according to an exemplary embodiment of the present invention.

Referring now to FIG. 1, there is shown therein a rear view of a vehicle 10 configured with a line-locking braking system according to an exemplary embodiment of the present invention. The vehicle 10 has a vehicle cabin 20 where the operator or driver is seated. The vehicle cabin 20 includes controls that the driver can utilize to select, enable and disable the line-locking feature for the braking system or the line-locking system. The shown vehicle 10 is capable of achieving an expedited launch using an exemplary vehicle line-locking braking system. The vehicle 10 does not require additional aftermarket vehicle systems to accomplish line-locking.

Figure 2:
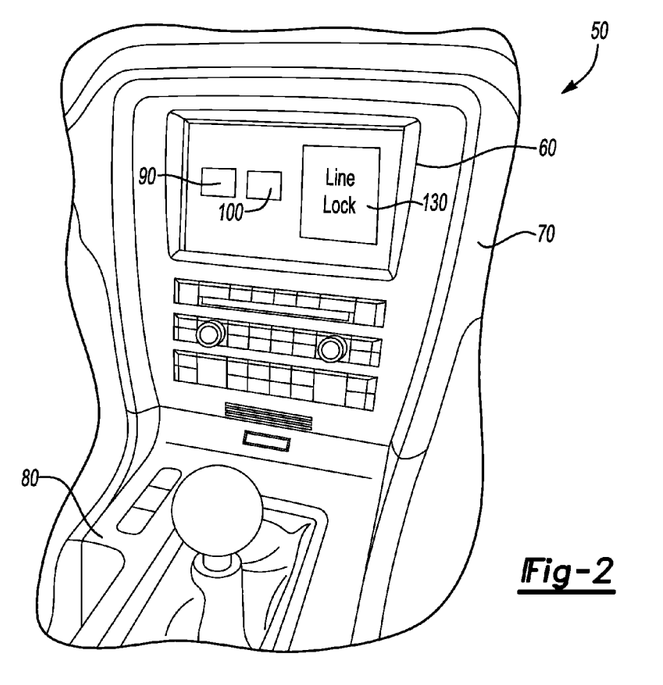
FIG. 2 is a perspective view of a vehicle interior having a user interface compatible with the vehicle shown in FIG. 1.
Figure 3:
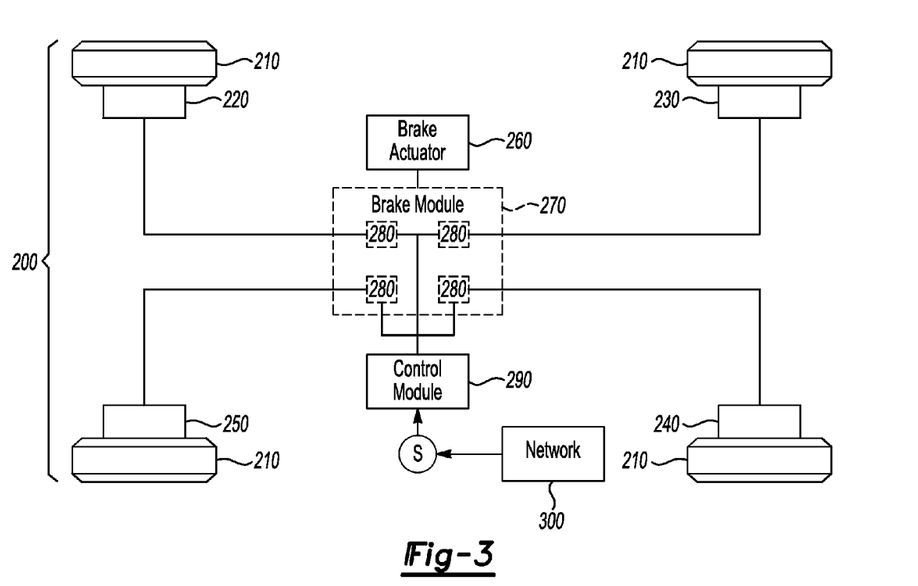
FIG. 3 is schematic illustration of a vehicle braking system compatible with the vehicle shown in FIG. 1.
Figure 4:
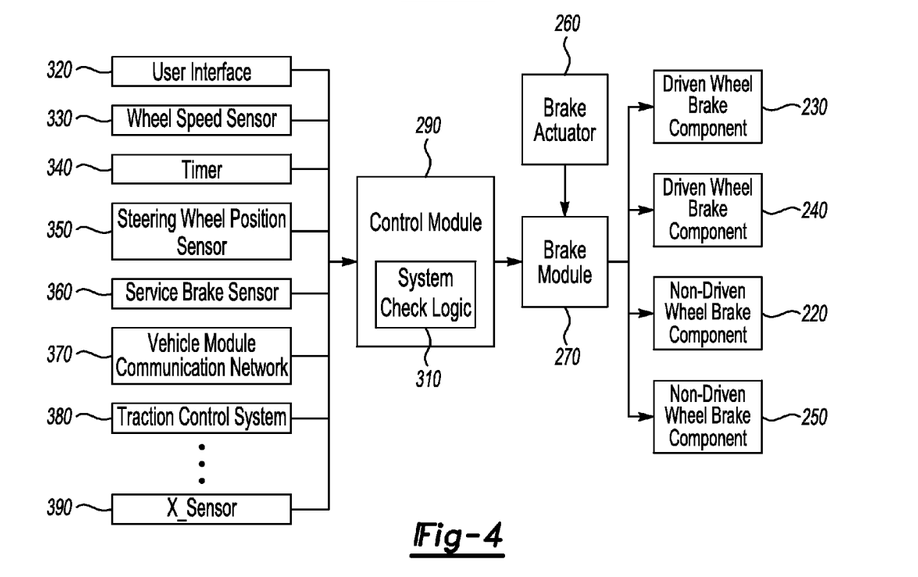
FIG. 4 is a schematic illustration of a control module compatible with the vehicle braking system of FIG. 3.

The shown vehicle 10 has a vehicle line-locking braking system that includes a hydraulic braking module containing a plurality valves (as discussed with respect to FIGS. 3-4). Valves are controlled by an electric control module. Valves control the distribution of brake pressure between a brake actuator and each individual wheel's braking components. In the shown embodiments, the electric control module includes system check logic that can process signals indicative of various system conditions, driver requests and/or vehicle conditions. To enable the line-locking feature for the braking system, the driver first selects this mode of control via a vehicle selection menu in the message center (e.g., 130 as shown in and discussed with respect to FIG. 2). Once selected, the driver will apply the service brakes to a predefined pressure level as measured by the electronic control module. When the desired brake pressure is achieved, the brake control module will isolate the vehicle's front wheel brake component(s) or circuit(s) from the driver via the hydraulic brake module. The pressure will be locked and this status is communicated to the driver. At that point the driver can remove pressure from the brake pedal and the front brakes will remain applied while the rear brakes (or driven wheel braking components) are relieved of brake pressure. The driver can then apply throttle and initiate a burn-out or "burning rubber" on the rear wheels 30, creating tire smoke 40 as shown in FIG. 1.

The vehicle includes a driver display 50 with a user interface 60 for the driver, as shown in FIG. 2. The user interface 60 can be incorporated into a vehicle interior. As shown, the user interface 60 is included in the instrument panel 70 or instrument cluster. The interface 60 can be included in a center console (e.g., 80), overhead console or other locations in the vehicle interior as well. An electric control module is linked to the user interface 60 and configured to receive a signal from the user interface for activation or deactivation of a line-locking mode of operation. Control module can be hardwired or in wireless communication with the user interface 60.

User interface 60, as shown in FIG. 2, is configured to provide a user with audio and/or visual indicators of the braking system and vehicle conditions. The electric control module comprises system check logic configured to assess at least one vehicle condition and control the valve system according to the vehicle condition. The shown interface 60 may include a touch screen with "soft keys" 90 and 100 to receive user inputs or display the same with dedicated switching devices. The user interface 60 can also receive driver inputs with respect to control of the braking system. For example, in the shown embodiment, the user interface is configured with a start command key 90 that instructs the control module to start from the beginning of the operating sequence for the line-locking feature of the braking system. The user interface also includes a cancel command key 100 configured to cancel the line lock selection. The keys 90 and 100 can change in terms of location and function. Where the driver has initiated the starting sequence of the line-locking feature, the sequence can be interrupted. The user interface also includes a message center 130 configured to deliver system information to a vehicle user. As shown, the message center 130 is displaying a message related to the line-locking system activation ("Line Lock") indicating that the system is active. Other information and/or instructions can be displayed on the message center 130. Information can relate to a myriad of driver requests, system conditions and/or vehicle conditions, such as e.g., time expiration, wheel speed, steering wheel position, service brake application and/or traction control.

User interface 60, as shown in FIG. 2, is configured to receive audio commands and output information audibly as well. User interface 60 includes a microphone linked to the control module. Control module is configured with voice recognition software. User interface 60 is configured to, for example, restart the operating sequence for line locking upon receiving a "reset" audio command. The user interface 60 is also configured to abandon the line-locking braking sequence by receiving the cancel command. The "cancel" audio command interrupts the operating sequence of the control module when the braking system is operating in line-locking mode.

In the embodiment illustrated in FIG. 2, the message center 130 is configured to audibly deliver system information to a vehicle user. User interface includes a speaker (or can be linked to an existing vehicle speaker system) to communicate system information to the driver. For example, where the system has abandoned the line-locking operating sequence the user interface 60 can send a text or audible message such as "Line Lock OFF" to the driver. Any number of messages or commands can be programmed into the control module for display or projection.

Referring now to FIG. 3, there is shown therein a vehicle braking system 200 according to an exemplary embodiment of the present invention. The braking system 200 is designed for use with a four-wheel vehicle, for example 10, as shown in FIG. 1. The braking system in FIG. 3 is attached to a vehicle chassis having four wheels 210. At each wheel a braking component (or circuit) 220, 230, 240 and 250 is dedicated to selectively apply braking pressure against the wheel 210. Braking components 220, 230, 240 and 250 can be, for example, disc brakes, drum brakes or electric brakes. Hydraulic fluid is supplied to the braking components 220, 230, 240 and 250 via a brake actuator 260. The brake actuator 260 provides fluid to braking components 220, 230, 240 and 250 through a hydraulic braking module 270.

A plurality of valves 280 are positioned between the hydraulic brake actuator 270 and the brake components 220, 230 and 240, 250, as shown in FIG. 3. The illustrated hydraulic braking module 270 includes valves 280 that control the distribution of fluid from the hydraulic actuator 260 to each brake component 220, 230, 240 and 250. Hydraulic brake module 270 is configured to provide brake pressure from the brake actuator 260 to each individual wheel component 220, 230, 240 and 250. Module 270 is configured to selectively and at least partially disconnect the brake actuator 260 from the wheel components 220, 230, 240 and 250. In this way, the brakes can be selectively turned on and off on any individual wheel or set of wheels.

An electric control module 290 is also included in the braking system 200 shown in FIG. 3. Control module 290 is configured to control the hydraulic brake module 270 and the valves 280 therein. The valves 280 are controlled by solenoids linked to the control module 290. As shown, the control module 290 is linked directly to the brake module 270. Control module 290 can be directly connected or wirelessly connected to the brake module 270. Control module 290 includes a microprocessor configured to execute predetermined commands. Control module 290 is linked to a user interface to receive an electronic signal ("S") related to a driver request. The driver request can include, for example, on/off commands, time limitations and reset commands.

Control module 290 is configured to communicate with the user interface through a vehicle module (or data) communication network 300. The network 300 is linked to other vehicle control modules as well (such as e.g., the restraint control module, engine control module and transmission control module). The network 300 can also receive signals related to system conditions or vehicle conditions. Signals can be indicators of vehicle conditions, driver requests, system conditions and/or commands for the control module 290. The electric control module 290 includes system check logic—as discussed in part with respect to FIG. 4—configured to assess whether a predetermined user command is entered into the user interface. Control module 290 is responsive to various user commands, such as e.g., a reset command, cancel command or a break in the ignition key cycle.

Referring now to FIG. 4, there is shown therein an electric control module 290 with other line-locking braking system components. Control module 290 is configured to at least control a brake module that governs the distribution of fluid between the brake actuator 260 and the individual brake components 220, 230, 240 and 250. The line locking system can be disabled by re-connecting the brake actuator 260 to the wheel components 220, 230, 240 and 250. Control module 290 is able to measure various vehicle attributes through sensors configured to take measurements of vehicle performance characteristics, driver requests and/or system conditions.

The following are examples of the primary inputs that the control module 290 utilizes to engage and disengage the vehicle line-locking braking feature. The enabling of the line lock feature can be viewed generically as a two step process involving: (i) selecting the feature (which allows the activation sequence to begin); and (ii) the activation of the feature where brake pressure remains applied to the undriven wheels without service brake application.

As shown in FIG. 4, the electric control module 290 includes system logic 310 configured to control the distribution of fluid between the hydraulic brake module 270 and each individual wheel braking component 220, 230, 240 and 250 according to a system condition, driver request or vehicle condition. Control module 290 is configured to disable any valve in the brake module 270 (thereby allowing brake pressure to the wheel's braking components) under predetermined conditions and deactivating the line-locking system. System logic 310 processes the data received from inputs (or sensors) and controls the brake module 270 according to a programmed algorithm.

For example, system logic 310 is configured to assess whether a predetermined user command (or driver request) is entered into the user interface 320, as shown in FIG. 4. User interface 320 is linked to the control module 290. The driver request can be, for example, system activation or deactivation. If a deactivation (or cancel) command is received, system logic 310 is configured to disable at least one valve in the brake module 270 to allow for brake pressure to be applied to rear wheels or non-driven wheel brake components (e.g., 220 and 250).

System logic 310, as shown in FIG. 4, is also configured to assess vehicle and/or wheel movement via individual wheel speed sensors 330 located on each wheel. The sensors 330 can be speed sensors or accelerometers. System logic 310 is configured to prohibit selection of the line-locking feature if the vehicle wheels are in motion (or cancel the line-locking feature) in a controlled manner.

The system logic 310 is also configured to assess whether a predetermined time limit has been exceeded. A timer 340 is linked to the control module 290. Selection of the line locking feature via the user interface 320 initiates the timer 340. System logic 310 is configured to cancel the selection of the line lock feature if the timer 340 exceeds a predetermined time limit and burn out has not been activated. In one embodiment, the timer 340 is set to 300 seconds from activation of the line locking system. In another exemplary embodiment, the timer 340 is set to 30 seconds from activation of the line locking system; if the timer exceeds this limit the feature in canceled and normal vehicle braking is restored.

The system logic 310, as shown in FIG. 4, is configured to assess a steering wheel position through sensor 350. The steering wheel column or gear includes position sensor 350 which is in communication with control module 290. In one embodiment, the control module 290 is configured to cancel the activation of the line lock feature when the steering wheel position is less than or greater than a predetermined angular range. For example, if the steering wheel is turned more than 180 degrees from a longitudinal axis of the vehicle the control module can abort the line-locking activation and restore normal braking to the vehicle.

The system logic 310 is also configured to assess the driver's application of the vehicle's service brakes. Sensor 360 measures brake pedal movement and can also be utilized to indicate service brake application. The control module 290 contains logic to prohibit selection of the line-locking feature if the vehicle's service brakes are not applied. Additionally, the hydraulic brake module 290 can include a brake system pressure sensor to measure the brake pressure in the brake system as a result of driver application. If the predetermined brake pressure is not achieved the line lock feature will not activate. The control module 290 is also configured to assess whether a predetermined brake system pressure has been exceeded. An exemplary predetermined brake pressure is 60 psi.

The system logic 310, as shown in FIG. 4, is further configured to assess the status of the vehicle module communication network 370. The system logic 310 will prohibit the selection of the line lock feature or cancel the activation of the feature if the vehicle communication network is not operating correctly or according to a predetermined algorithm. For example, if the wireless signal strength is lower than a predetermined range, the line locking feature can be disabled. The signal can be measured by a receiver (for example). Doing so could inhibit receiving vehicle information required by the control module for line lock functionality.

The system check logic 310, as shown in FIG. 4, is configured to assess whether a vehicle traction (or stability) control system 380 is functioning according to a predetermined algorithm. The vehicle traction control system 380 is configured to control the vehicle's antilock braking system and other all-weather control features. For example, if the stability control system is inactive, the control module 290 can disable at least two valves in the brake module 270 and provide pressure to the rear wheel components (or non-driven wheel brake components 220 and 250). The electronic module 290 combined with the hydraulic module 270 is designed to perform vehicle stability control functions such as traction control and yaw control.

Any number of additional sensors can be linked to the control module 290 for use with the line locking braking system. "X_Sensor" 390 represents any number of exemplary sensors that can be included in the system. For example, in the shown embodiment the vehicle braking system includes system check logic 310 configured to assess whether the driver's seatbelt is fastened, changes in the yaw rate of the vehicle, or changes in lateral forces of the vehicle. Such sensors can be directly wired or indirectly wired to the control module 290.

Though the links shown between system components are described in terms of hardwired connections, any one of the components can be wirelessly linked to the control module. Bluetooth technology, configured to enable short-range communication between electronic devices, is utilized to enable the components to communicate with the control module wirelessly. Other wireless standards or technologies can be used with the braking system such as infrared systems, RF systems, IEEE standard 802.11 and other communications platforms.

Figures 5, 6A:
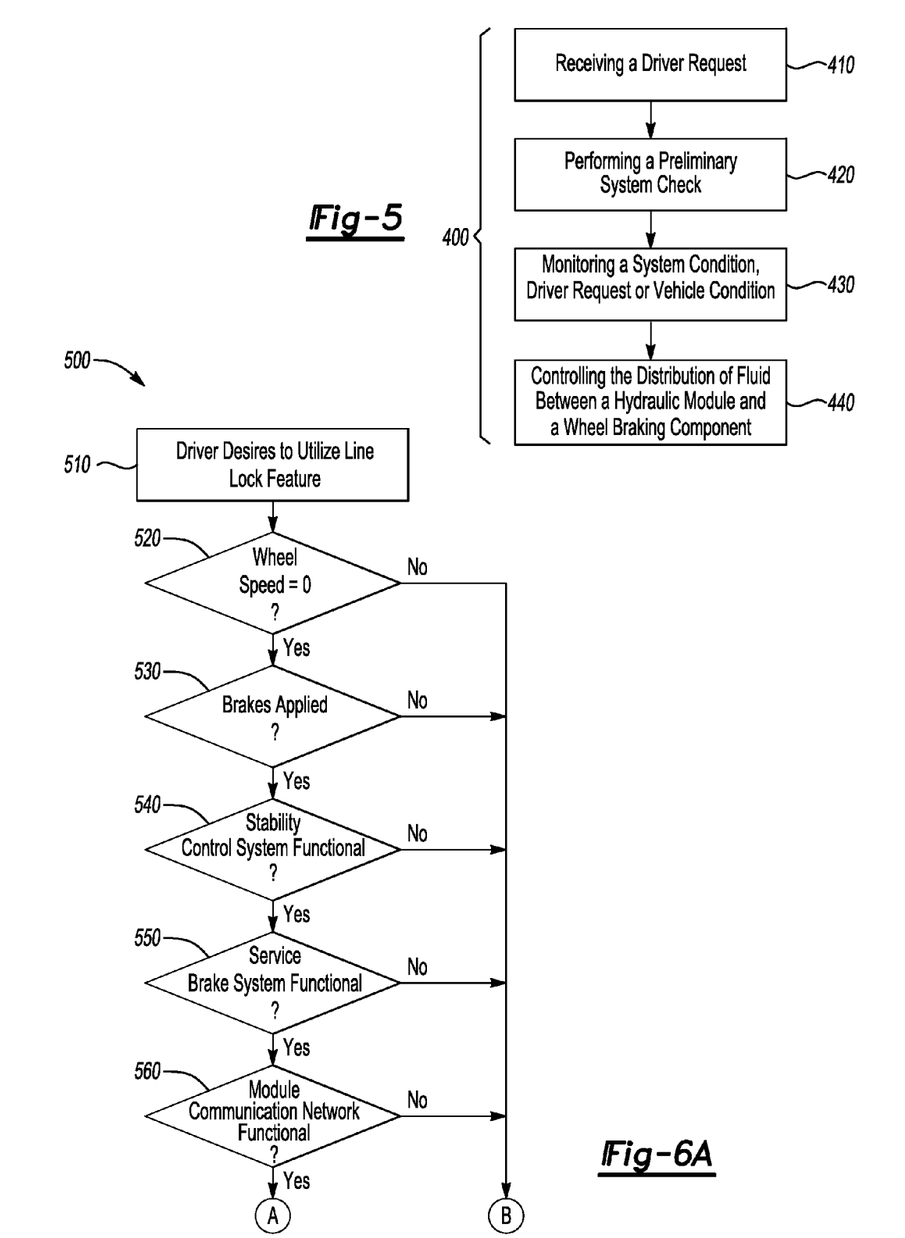
FIG. 5 illustrates a computer-implemented method of line-locking a hydraulic vehicle braking system.
FIGS. 6a-c illustrate an algorithm for controlling a vehicle braking system and user message center.

Referring to FIG. 5, there is shown therein a computer-implemented method 400 of line-locking a hydraulic vehicle braking system. The method 400 can be implemented, for example, by an electronic control module or any electric circuit having a processor. The steps of the method 400 include receiving an electric signal related to a driver request 410. An exemplary driver request can be either activation or cancellation of the line-locking system. At step 420 the method includes performing a preliminary system check of a system condition. The system condition can be, for example, whether the vehicle module communication network is emitting a signal of sufficient strength. At step 430 the method monitors either a system condition, driver request or a vehicle condition. Either one of these elements can change during execution of the algorithm. For example, the steering wheel position can be altered or the wheel speed may change. If any of these conditions or requests exceed an intended range or threshold the system disables the line-locking feature. At step 440 the computer controls the distribution of fluid between a hydraulic module and a wheel braking component according to the system condition, driver request or vehicle condition. In this manner the line-locking feature can be disabled whenever a preliminary check is unsatisfied and/or a monitored condition is outside of a predetermined threshold or range.

Figure 6B:
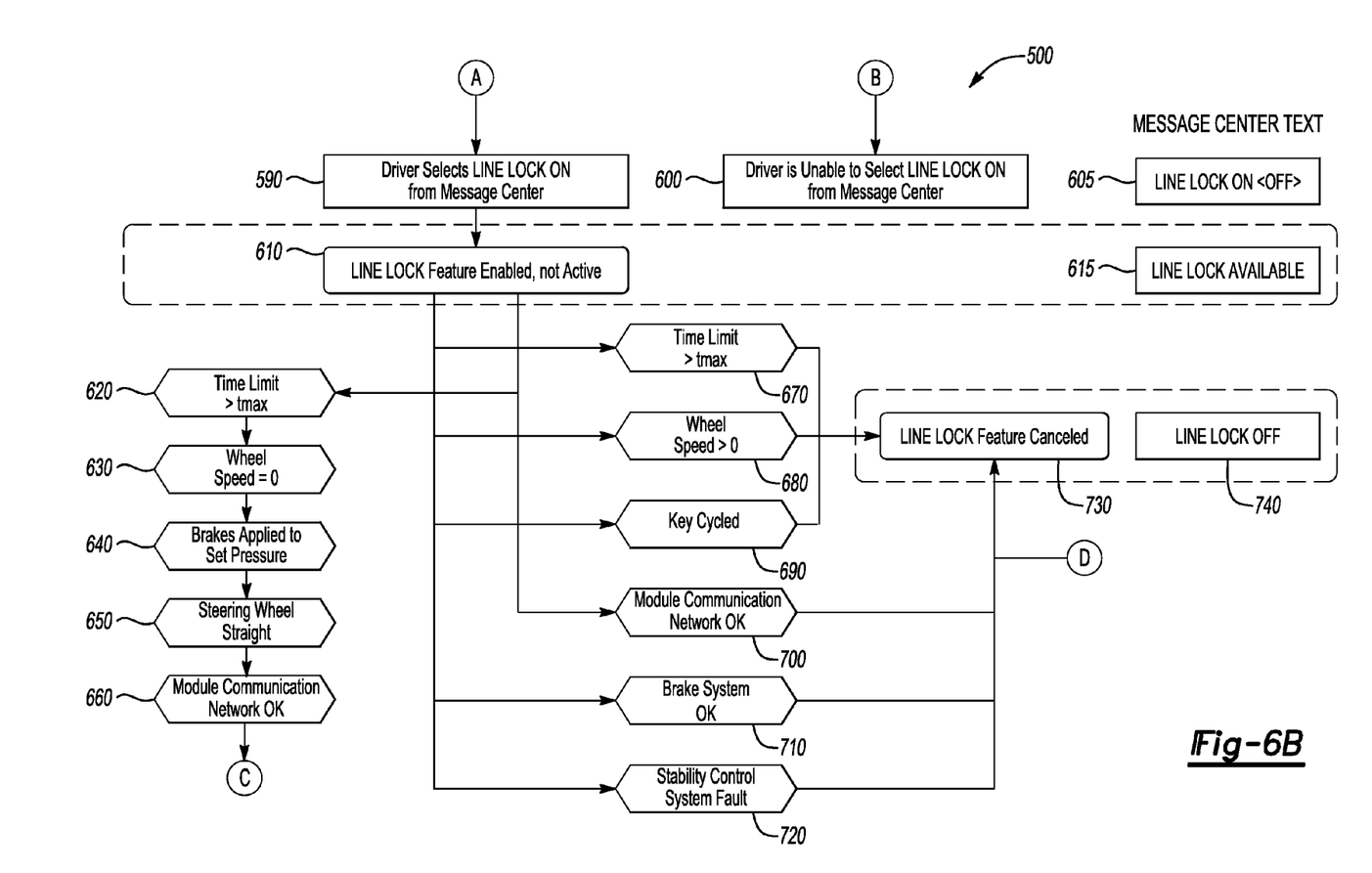
Figure 6C:
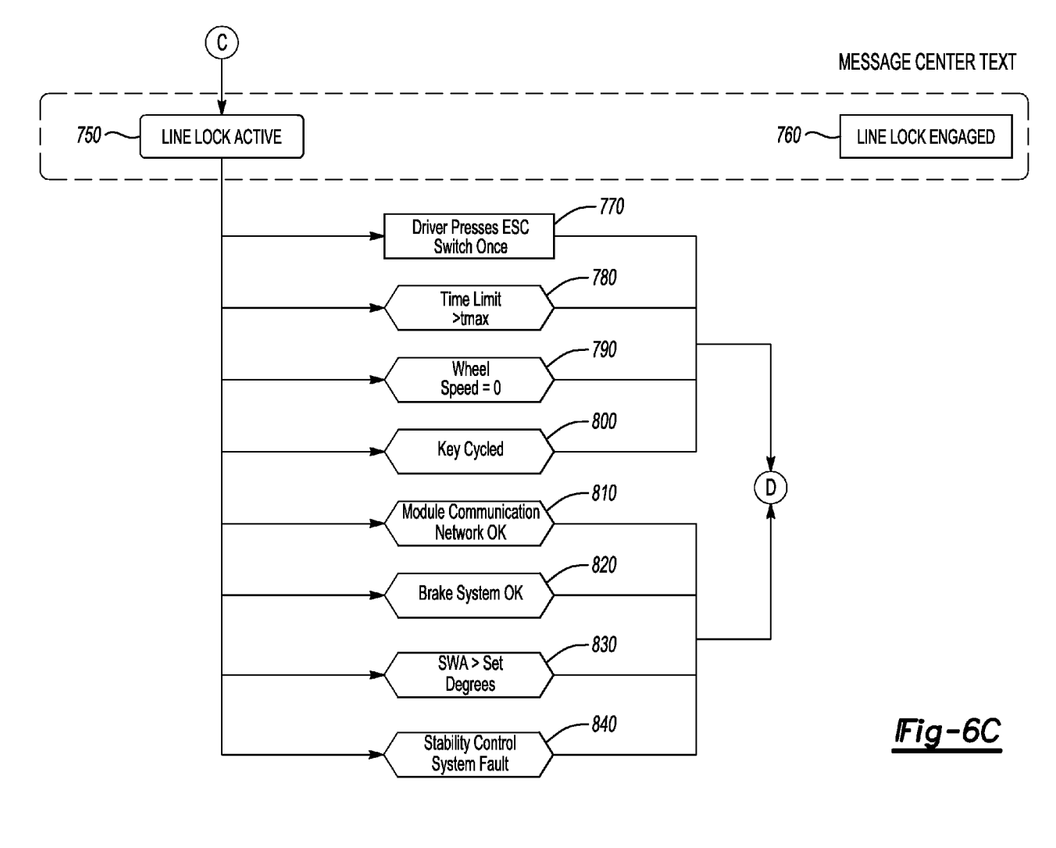

Referring now to FIGS. 6*a-c*, there is illustrated therein a detailed algorithm 500 for controlling a vehicle braking system and user message center/interface according to an exemplary embodiment. The illustrated algorithm 500 can be executed by a processor circuit incorporated into a control module (e.g., system logic 310, as shown in FIG. 4). System commands can be inputted into the control module via a user interface (e.g., 60 as shown in FIG. 2). User interface 60 sends electric signals to a control module or computer to execute the steps of the algorithm 500, as shown in FIGS. 6*a-c*. The control module implements the line locking algorithm 500 by controlling the distribution of fluid between the hydraulic module and the individual wheel braking components.

At step 510, as shown in FIG. 6*a*, the line-locking mode of operation is initiated. Driver enters information indicative of a desire to utilize the vehicle line lock feature. The control module checks several criteria to determine if the line lock function will be allowed to activate. In this embodiment, the criteria that the control module uses to determine if the line lock feature can be selected is as follows:

wheel must be at speed=0 (step 520);
vehicle brakes must be actively applied (step 530);
stability control system must be fully functional (step 540);
vehicle service brake system must be fully functional (step 550); and
module communication network must be functioning properly (step 560).

If all of the above criteria are met with positive responses, the driver is able to select the line lock feature from a driver interface at step 590, as shown in FIG. 6*b*. Doing so results in a the user interface displaying a message to the driver that the line lock feature is selected (or on) and ready to be triggered, but not activated as shown at step 605. In the case that any of the above criteria are determined to false (e.g. wheel speed>0), the driver would not be able to select the line lock feature (as shown at step 600).

At step 610, the vehicle line lock feature is enabled, but not fully active (i.e. the brakes are not applied to the non-driven wheels). A message is displayed on the message center at step 615. In this embodiment, the criteria that the control module uses to determine if the line lock feature can be activated is as follows: time limit or maximum for feature selection must not have been exceeded (step 620); wheel must be at speed=O (step 630); vehicle brakes must be actively applied to achieve a pre-determined pressure as determined by the electric control module (step 640); steering wheel must be within a pre-determined degree of the longitudinal axis or straight (step 650); and module communication network must be functioning properly (step 660).

If the above conditions are satisfied, the line lock function will be activated at step 750, as shown in FIG. 6*c*. The driver can remove pressure from the brake pedal, the non-driven wheel braking components will remain applied while the driven wheels are free to rotate. The driver will be notified of this action via the user interface or message center with a message at step 760.

In reference to step 600 (as shown in FIG. 6*b*) when the Line Lock feature is selected, but not activated, there are also constant system checks that could result in the line lock feature being canceled before activation. In this embodiment, the criteria that the control module uses to determine if the line lock feature should be canceled after selection can be as follows: inquiring into the time limit of line lock engaging expiring (step 670); wheel speed exceeding a predetermined limit (step 680); vehicle ignition being cycled between on and off (step 690); critical modules on a LAN network—e.g., HSCAN—are not functioning properly (step 700); service brake system is not functioning as intended (step 710); and stability control system is not functioning as intended (step 720).

In the case that any of the above mentioned criteria are not satisfactorily met, the line lock feature would be canceled at step 730 and a message would be displayed to the drive that the line lock feature has been turned off at step 740.

Once the line lock feature has been activated at step 750, as shown in FIG. 6*c*, the following items would result in the feature being canceled and normal service braking being restored to the vehicle: driver presses deactivation or "Esc" switch (step 770); activation time limit has been exceeded (step 780); wheel speed exceeds a predetermined limit (step 790); vehicle ignition being cycled between on and off (step 800); critical modules on a LAN network—e.g., HSCAN— are not functioning properly (step 810); service brake system is not functioning as intended (step 820); steering wheel angle exceeding a predetermine degree from the longitudinal axis of the vehicle (step 830); or stability control system not functioning as intended (step 840).

In the case that any of the above mentioned criteria are not satisfactorily met, the line lock feature is canceled at step 730 and the driver is notified via a message displayed in the message center or user interface at step 740, as shown in FIG. 6*b*.

Control module can be configured to include a greater or fewer number of system checks before activating the line locking feature. The exemplary system checks are designed to improve the performance of the vehicle before, during or after launch. Other system checks can be programmed into a control module or added to the braking system and be within the scope of the present invention. Any type of existing or added processor can be utilized to effectuate the disclosed method.

It will be apparent to those skilled in the art that various modifications and variations can be made to the methodologies of the present invention without departing from the scope its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

We claim:

1. A computer-implemented method of line-locking a hydraulic vehicle braking system, comprising:
    receiving an electric signal related to a driver request;
    performing a preliminary system check of a system condition;
    monitoring the system condition, driver request or a vehicle condition; and
    controlling the distribution of fluid between a hydraulic module and a wheel braking component according to the system condition, driver request or vehicle condition;
    wherein the performing a preliminary system check or monitoring includes assessing whether a predetermined line lock activation time limit has been exceeded.

2. The method of claim 1, wherein the performing a preliminary system check or monitoring also includes assessing whether a wheel speed has been exceeded.

3. The method of claim 1, wherein the performing a preliminary system check or monitoring also includes assessing whether a predetermined steering wheel position has been exceeded.

4. The method of claim 1, the performing a preliminary system check or monitoring includes also assessing whether a predetermined signal related to a driver request is received.

5. The method of claim 1, wherein the performing a preliminary system check or monitoring also includes assessing whether a vehicle service brake is applied.

6. The method of claim 5, wherein assessing whether the vehicle service brake is applied includes:
    measuring a brake system pressure; and
    assessing whether a predetermined brake system pressure has been exceeded.

7. The method of claim 1, wherein the controlling the distribution of fluid includes disconnecting the brake actuator from the wheel brake component.

8. A vehicle line-locking braking system, comprising:
    a brake actuator;

a hydraulic brake module configured to provide brake pressure from the brake actuator to wheel braking components; and an electric control module configured to control the brake module according to a system condition, driver request or vehicle condition;

wherein the electric control module comprises system logic configured to assess whether a predetermined line lock activation time limit has been exceeded; and wherein the control module is configured to disable a valve in the brake module if the predetermined time limit has been exceeded.

9. The braking system of claim 8, wherein the electric control module is linked to a user interface, configured to receive a signal from the user interface; and wherein the system logic is further configured to assess whether a predetermined user command is entered into the user interface.

10. The braking system of claim 9, wherein the predetermined user command is a selection command, cancel command or break in ignition key cycle.

11. The braking system of claim 8, wherein the system logic is further configured to assess a wheel speed; and wherein the electric control module is configured to disable a valve in the brake module when the wheel speed exceeds a predetermined amount.

12. The braking system of claim 8, wherein the system logic is further configured to assess a steering wheel position; and wherein the control module is configured to disable a valve in the brake module when the steering wheel position is greater than a predetermined angular range.

13. The braking system of claim 8, wherein the system logic is further configured to assess a traction system mode of operation; and wherein the control module is configured to disable a valve in the brake module if the traction control system is in a mode of operation that allows driven wheel spin.

14. The braking system of claim 8, wherein the system logic is further configured to assess whether a vehicle service brake is applied; and wherein the control module is configured to disable a valve in the brake module when the service brake is not applied.

15. The braking system of claim 8, wherein the system logic is further configured to assess whether a vehicle service brake is applied to a predetermined brake pressure; and wherein the control module is configured to disable a valve in the brake module when the service brake is not applied to a predetermined brake pressure.

16. The braking system of claim 8, wherein the system logic is further configured to assess a vehicle module communication network; and wherein the control module is configured to disable a valve in the brake module when the module network is not functioning according to a predetermined algorithm.

17. The braking system of claim 8, wherein the system logic is further configured to assess a vehicle stability control system; and wherein the control module is configured to disable a valve in the brake module when the stability control system is not functioning according to a predetermined algorithm.

18. A vehicle configured to line-lock, the vehicle comprising:

a user interface;

an electric control module configured to receive a signal from the user interface for activation of a line-locking system; and a hydraulic brake module including a plurality of valves configured to control brake pressure to wheel brake components;

wherein the electric control module comprises system logic configured to assess a line-locking system condition, driver request or vehicle condition;

wherein the system logic is configured to assess whether a predetermined line lock activation time limit has been exceeded; and wherein the control module is configured to disable a valve in the brake module if the predetermined time limit has been exceeded.

19. The vehicle of claim 18, wherein the user interface is incorporated into an instrument panel in the vehicle.

20. The vehicle of claim 18, wherein the user interface includes a cancel command key configured to disable the line lock system.

21. The vehicle of claim 18, wherein the user interface includes a message center configured to deliver line-locking system information to a vehicle user.

22. The vehicle of claim 18, wherein the electric control module is configured to control the valves according a line-locking system condition, driver request or vehicle condition.

* * * * *